May 23, 1944.   T. R. PORTER   2,349,754
METHOD AND INSTRUMENT FOR MEASURING ULTRA-VIOLET RADIATIONS
Filed Nov. 30, 1940   2 Sheets-Sheet 1

INVENTOR
T. R. PORTER.
BY J. W. Greenhowe
ATTORNEY

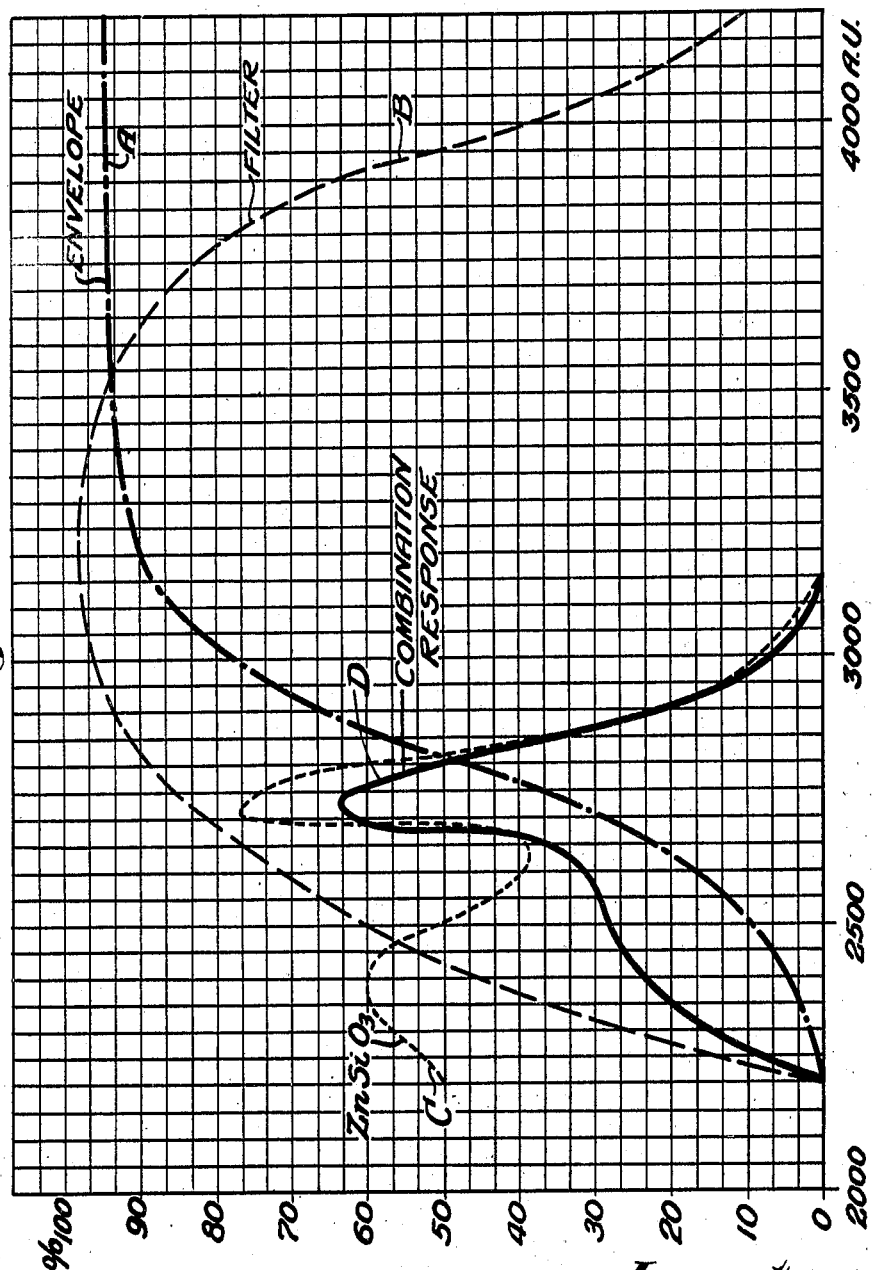

Patented May 23, 1944

2,349,754

UNITED STATES PATENT OFFICE 2,349,754

METHOD AND INSTRUMENT FOR MEASURING ULTRAVIOLET RADIATIONS

Thomas R. Porter, Bloomfield, N. J., assignor to Westinghouse Electric & Manufacturing Company, East Pittsburgh, Pa., a corporation of Pennsylvania Application November 30, 1940, Serial No. 368,100

5 Claims. (Cl. 250—71)

This application is a continuation in part of my copending application, Serial No. 223,018, filed August 4, 1938, for "Method and instrument for measuring ultra-violet radiations," and owned by the assignee of the present application.

This invention relates to a method and instrument for measuring ultra-violet radiations, and is particularly adapted for measuring the output of lamps which generate bactericidal radiations.

The principal object of my invention, generally considered, is the measurement of ultra-violet radiations by first absorbing most, or practically all, of the longer wave component of mixed radiations, the shorter or ultra-violet component of which is to be measured, and then measuring the remainder.

Another object of my invention is the provision of a method and apparatus for measuring ultra-violet radiations, which is particularly adapted for use when the intensity of the visible component of the radiations to be measured is low, comprising the absorption of most of the visible component, the transformation of the remainder into visible light and the measurement of said transformed remainder, as by means of a light meter, thereby getting a ready indication of the amount of ultra-violet light delivered initially by the source.

A further object of my invention is the provision of an instrument for measuring ultra-violet light, and particularly the bactericidal output of a discharge tube, comprising a light meter, a frame adapted to rest on said meter and holding a filtering and a fluorescent screen immediately over the target of the meter and a discharge tube above said filter, whereby the output from said tube impinges on the filter and most of the visible light component thereof is absorbed thereby, the remainder comprising most of the ultra-violet light component passing through said filter and impinging on the fluorescent screen which transforms it into visible light for measurement by said meter as an indication of the amount of ultra-violet light delivered by the discharge tube.

Other objects and advantages of the invention, relating to the particular construction and arrangement of the various parts, will become apparent as the description proceeds.

Referring to the drawings illustrating my invention:

Figure 6 is a chart illustrating how the components of the meter cooperate with one another to produce the desired result.

Figure 1:
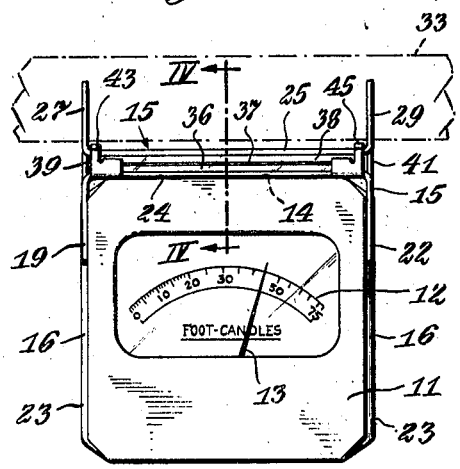
Figure 1 is a side elevational view of an instrument for measuring light in foot-candles, carrying a fluorescent screen, a filter, and means for supporting a discharge lamp, the last being indicated diagrammatically in dotted lines.

Ultra-violet radiations from any source are nearly always accompanied by visible light and infra-red radiations. A filter may be used for separating the different kinds of radiations to measure them individually, but the process of measurement is complicated by so doing. I have found that an ordinary or conventional self-contained, direct reading visible light meter may be employed for measuring the ultra-violet component of radiations, if means are first used for screening out the visible components of the radiations, at least to a large extent, and then transforming the remainder, which is largely ultra-violet light, into visible light, so that the same may be directly measured without further complications.

In accordance with my invention, I preferably use an ordinary or conventional visible light meter, reading in foot-candles, and screen from the source to be measured, the component, such as the visible portion, which would ordinarily actuate the meter, and measure the intensity of the remainder, preferably by transforming said remainder into visible light by means of a fluorescent screen sensitive to the part of the spectrum which it is desired to measure.

Instead of using a self-contained, direct-reading foot-candle meter, I may, of course, substitute a suitable visible light-measuring photo-voltaic cell, such as a copper oxide cell, to which is attached a microammeter.

The fluorescent material selected to form the screen is such that it responds to the particular band or range of ultra-violet which it is desired to measure, and these radiations react upon the fluorescent material producing visible light to which the cell or foot-candle meter is responsive.

In measuring a source of ultra-violet radiations, the same is desirably disposed very close to the target of the meter or photo-voltaic cell, which is shielded from all extraneous light, and a reading taken of the radiations which pass through the filter and fluorescent screen used therewith. The reading is, of course, that of the small proportion of visible light originally delivered by the source of radiations to be measured, plus the relatively large proportion of ultra-violet light, transmitted by the selected filter, and then transformed to visible light by the selected fluorescent material. The reading, therefore, is not a direct measurement of the equivalent amount of ultra-violet light delivered by the source to be measured, but, by suitably calibrating the foot-candle meter or microammeter, it is possible to obtain direct readings of the amount of ultra-violet, and even without calibration, it is easy in this way to compare the output of two different discharge tubes or other sources of ultra-violet radiations.

Referring now to the drawings in detail, like parts being designated by like reference characters, there is shown a conventional unitary or self-contained, direct-reading foot-candle meter 11, or other instrument for measuring visible light. Said meter includes a dial 12 over which moves a pointer or hand 13 when the target 14, shown covered by the frame 15 and parts carried thereby, is energized by light impinging thereon.

The casing of the meter 11 desirably has its ends grooved or notched, as indicated at 16 and 17, to receive the depending legs 18, 19, 21, and 22 which straddle the outstanding portions 23 between the grooves or notches 16 and 17, thereby holding the frame 15 in place over the target 14 of the meter.

The frame 15 is desirably formed in two parts, the lower part 24 provided with the depending legs 18, 19, 21 and 22 and the upper part 25 provided with upwardly extending arms 26, 27, 28 and 29, providing notches 31 and 32 therebetween for the reception of the discharge tube 33, or other source or means for generating ultra-violet radiations.

Between the intermediate portions of the upper and lower parts 24 and 25 of the frame 15, which are formed with registering apertures 34 and 35, are preferably disposed a piece of glass or other transparent medium 36, carrying a layer of fluorescent material or phosphor 37 which is responsive to the ultra-violet radiations desired to be measured. Above this layer 37 is desirably carried a filter 38 which is preferably one adapted to absorb as much as possible of the visible radiations, or those not to be measured, and transmit a large proportion, or most, of the ultra-violet radiations to be measured.

Figure 3:
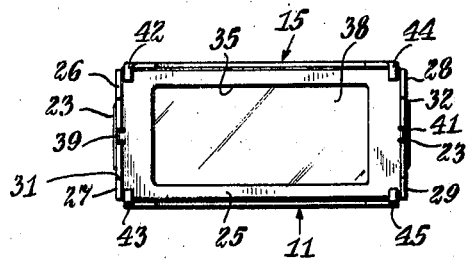
Figure 3 is a plan of the instrument shown in Figures 1 and 2, with the discharge lamp removed.
Figure 4:
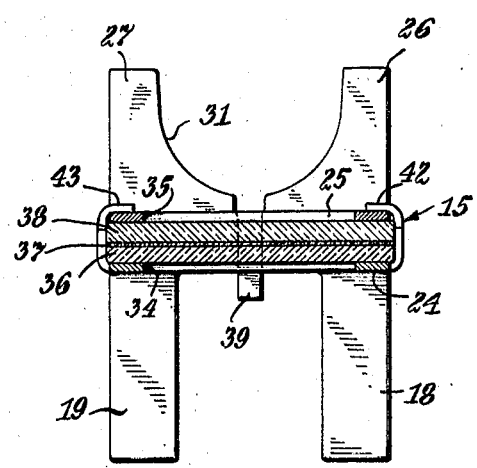
Figure 4 is an enlarged sectional view of the supporting frame, filter, and fluorescent screen carried thereby, on the line IV—IV of Figure 1, in the direction of the arrows.
Figure 5:
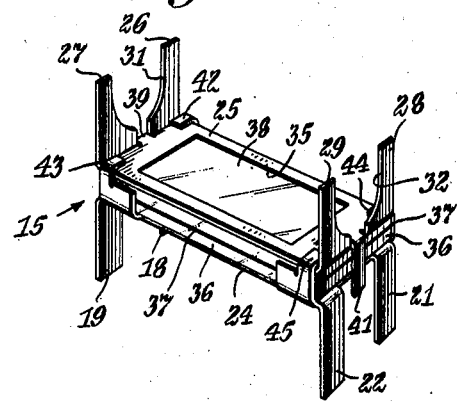
Figure 5 is a perspective view of the frame, filter, and fluorescent screen carried thereby, removed from the supporting meter.

In order to hold the parts of the frame together with the filter and fluorescent screen held tightly therebetween, the upper portion 25 of the frame is desirably formed with a pair of tabs 39 and 41 which fit down over the ends of the filter, fluorescent screen, and the supporting portion of the lower frame member 24, while said lower frame member is desirably formed with upstanding tabs 42, 43, 44 and 45 which are bent over the upper frame member 25, as shown most clearly in Figure 3, to thereby hold the elements 24 and 25 and associated parts in proper assembled relation.

Figure 2:
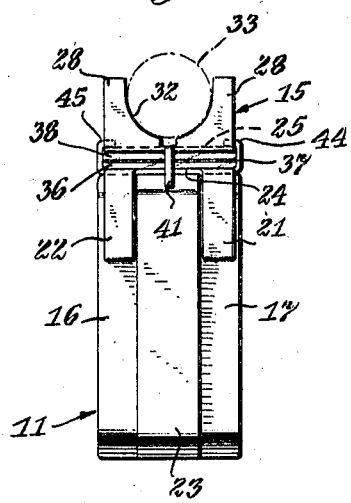
Figure 2 is an end elevational view of the apparatus shown in Figure 1.

The apparatus illustrated in Figures 1 to 5, inclusive, may be used as follows:

The source of ultra-violet light 33 which is to be measured is energized, while supported between the arms 26, 27, 28 and 29, as viewed in Figures 1 and 2, while the whole apparatus and source are protected from extraneous light, as by being positioned in a dark room. The reading given on the dial 12 by the pointer 13 represents the ultra-violet component, of the light emitted by the source 33, which has passed through the screen 38 and been transformed to visible light by the layer of fluorescent material 37 forming the screen 36—37. If the filter 38 is constructed of Jena UG–5 #1157, or other glass having similar transmission properties, 2 millimeters thick, it will transmit only five per cent of light in the visible spectrum, and approximately fifty-two per cent of the radiation in the region of 2500 Angstrom units.

In this way, the light actually measured represents a large proportion of the ultra-violet component and only a small proportion of the visible component. It will, therefore, be seen that when using such a filter, especially when measuring a discharge lamp which gives mostly ultra-violet light, a very accurate rading of the ultra-violet component of the source may be obtained, because practically none of the original visible component passes through the filter and screen to be measured by the foot-candle meter, whereas a large proportion of the ultra-violet component of the radiations is thereby measured.

Although I have suggested a special form of filter, it will be understood that I do not wish to be limited to this, as any filter which absorbs nearly all of the radiations which are not to be measured, and transmits a large proportion of those which are to be measured, is suitable for the purpose.

It will also be understood that I have not specified a definite fluorescent material as necessarily used, because that depends on the portion of the ultra-violet spectrum which is of interest, and one fluorescent material is preferably employed when one portion or particular wave length of the spectrum is to be measured, while another fluorescent material is preferably employed when another portion on particular wave length of the spectrum is to be measured. In other words, the fluorescent material is selected in accordance with the band of ultra-violet radiations to be measured by my instrument. However, when measuring bactericidal radiations, I preferably use zinc silicate, which has a response which combines with that of the specified filter to give a combination response substantially agreeing with the bactericidal response over the ultra-violet band usually available in discharge lamps for that purpose.

From the foregoing disclosure, it will be seen that it is possible to make a meter particularly effective for a certain band of ultra-violet radiations, such as the bactericidal band or the erythemal band, as examples, and which is nearly ideal in that the reading may be directly proportional to the respective effectiveness of the various wave lengths in producing the desired result.

For example, if the bactericidal band is considered as from 2000 to 3000 A. U., a bactericidal meter should not respond to wave lengths below 2000 A. U. or above 3000 A. U. If the bactericidal power of one microwatt of energy at 2600 A. U. is, say three times that for one microwatt of energy at 2900 A. U., then the reading on the meter for one microwatt at 2600 A. U. should be three times that for one microwatt at 2900 A. U. In other words to be ideal, the shape and spectral distribution of the combination response curve should agree with the bactericidal effect curve, or that showing the relative effectiveness of radiations of varying wave lengths.

According to published data, the bactericidal band is from about 2000 to about 3000 A. U. with a peak at about 2650 A. U. Meters made in accordance with the present invention, have been tested in which the response is from about 2180 to about 3150 A. U., with a peak at about 2700 A. U. This is quite close to the ideal, especially when used for measuring the ultra-violet output from lamps such as are manufactured, by the company to which the present application is assigned, under the registered trade-mark "Sterilamp."

The foregoing will be better understood by reference to Figure 6 which is a chart showing a number of curves, that marked A being the transmission curve of an envelope such as used for such lamps.

A consideration of curve A will show that the glass of such an envelope cuts off at about 2180 A. U., and the percentage transmission of said glass gradually increases from there toward the longer waves. This shows that in measuring the bactericidal output, or the ultra-violet output of such a lamp in the bactericidal range, we need not concern ourselves with rays having a wave length shorter than about 2180 A. U.

A meter in accordance with my invention is, therefore, particularly suitable for measuring the bactericidal ultra-violet output of such a lamp, in terms corresponding with its effectiveness for killing bacteria, when having a filter with a transmission curve, as indicated by the reference character B, that is one which freely transmits ultra-violet rays having wave lengths longer than 2180 A. U., and very little visible light, when used with fluorescent material, such as zinc silicate, which has a response as indicated by the curve C.

Combining the curves B and C, by taking the products of the respective ordinates, we get a combination response curve D, indicated in full lines. It will be seen that this compares quite closely with the bactericidal curve, having its peak at about 2700 A. U., except that it begins at 2180 rather than about 2000. In other words by combining a visible light meter with a Jena UG–5, #1157 or equivalent filter, having a transmission curve as indicated at B, or one having an equivalent transmission between 2180 and 3150 A. U., and using, as the phosphor or fluorescent material, zinc silicate or other material having a response substantially corresponding with the curve C, we get a nearly ideal meter for measuring bactericidal radiations, or at least those in the range customarily found in the spectrum of discharge lamps used for bactericidal purposes. Of course, the radiations given off by the phosphor, when excited by the incident ultra-violet rays, must be such as will excite the copper oxide or active material of the photovoltaic cell.

Jena UG–5, #1157 filters were formerly purchased from a European supplier, but due to present unsettled conditions, comparable filters are now obtained from Corning Glass Works according to the following specifications:

Black glass, ultraviolet transmitting filter, abbreviated, black glass U. V. filter.

|   | Millimeters |
|---|---|
| Length | 42.5±.5 |
| Width | 22 ±.5 |
| Thickness | 1 ±.2 |
| Finish | Both surfaces shall be what is described as "cloth polished." This is not of the highest optical quality, but satisfactory for all applications except in precise image forming systems. |

The edges shall be smooth and free from cracks and nicks.

Transmission characteristics

| Wavelength in A° | Per cent transmission for 1 m.m. |
|---|---|
| 6,900 | 44.0 |
| 6,440 | <1.0 |
| 5,780 |  |
| 5,460 | 1 |
| 5,090 | 1.0 |
| 4,800 | 3.0 |
| 4,360 | 8.0 |
| 4,050 | 27.0 |
| 3,660 | 91.0 |
| 3,340 | 97.0 |
| 3,120 | 97.0 |
| 3,020 | 96.0 |
| 2,810 | 92.0 |
| 2,500 Bactericidal or tantalum photocell range | 57.0 |
| 2,200 | <1.0 |

The aggregate transmission for such black glass 1 mm. thick in the tantalum photocell range shall be 73%±7%.
The aggregate transmission for such black glass 1 mm. thick in the visible range shall be 6%±2%.

Although preferred embodiments of my invention have been disclosed, it will be understood that modifications may be made within the spirit and scope of the appended claims.

I claim:

1. The method of measuring the bactericidal ultra-violet component of radiations, comprising passing said radiations through a Jena UG–5 #1157 or Corning Black Glass U. V. filter, about one to two millimeters thick, in order to absorb practically all of the visible component, allowing the remainder which passes through said filter to impinge on a layer of a phosphor of zinc silicate, and allowing the transformed visible radiations passing through said layer to impinge on and be measured by a visible-light meter, whereby the curve of phosphor response, as modified by filter transmission, corresponds substantially with the curve of the bactericidal effect of the radiations to be measured.

2. An instrument for measuring the bactericidal ultra-violet component of radiations, comprising a conventional self-contained, direct-reading, visible-light meter having a target, a screen covering said target and coated with a phosphor responsive to the ultra-violet radiations to be measured, and a Jena UG–5 #1157 filter, or Corning Black Glass U. V. filter, about one to two millimeters thick, covering said screen in order to absorb all but about six per cent of the visible component of said radiations, and allow more than approximately fifty-two per cent of the radiation in the region of 2500 Angstrom units to impinge on said screen for transformation to visible light to be measured by said meter, whereby the curve of phosphor response, as modified by filter transmission, corresponds substantially with the curve of the bactericidal effect of the radiations to be measured.

3. A meter for bactericidal radiations, comprising a photovoltaic cell, a Jena UG–5 #1157, Corning Black Glass U. V. or equivalent filter adapted to substantially eliminate radiations below 2180 A. U. and above 4000 A. U., and a zinc silicate phosphor disposed beneath said filter, so that the combined response of said filter and phosphor corresponds substantially with the bactericidal effect of radiations within the region between 2180 and 3000 A. U.

4. A meter for measuring the bactericidal ultra-violet component of radiations, comprising a copper oxide photovoltaic cell, a transparent plate covering said cell and coated with zinc silicate, and a Jena UG–5 #1157 or Corning Black Glass U. V. filter, about one to two millimeters thick, covering said plate in order to absorb all but a small percentage of the visible component of said radiations, and allow a large percentage of bactericidal radiations to impinge on said screen for transformation to visible light to be measured by said meter, whereby the curve of phosphor response, as modified by filter transmission, corresponds substantially with the curve of the bactericidal effect of the radiations to be measured.

5. An instrument for measuring bactericidal ultra-violet radiations comprising a copper oxide photovoltaic cell, a plate of material transparent to visible radiations covering said cell, a Jena UG-5 #1157 or Corning Black Glass U. V. filter, from one to two millimeters thick, covering said plate, and a phosphor consisting of a layer of zinc silicate therebetween, whereby said filter will absorb some of the radiations to which said phosphor is responsive, as received from a conventional form of ultra-violet generating device, in such a way that the curve of phosphor response, as modified by filter transmission, corresponds substantially with the curve of bactericidal effect of the radiations to be measured.

THOMAS R. PORTER.